United States Patent
Iida et al.

(10) Patent No.: US 10,027,932 B2
(45) Date of Patent: Jul. 17, 2018

(54) INTERCOM SYSTEM AND COMMUNICATION METHOD

(71) Applicant: PANASONIC INTELLECTUAL PROPERTY MANAGEMENT CO., LTD., Osaka (JP)

(72) Inventors: Kouichi Iida, Fukuoka (JP); Tetsuya Ashizuka, Fukuoka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 52 days.

(21) Appl. No.: 15/001,592

(22) Filed: Jan. 20, 2016

(65) Prior Publication Data

US 2016/0249022 A1    Aug. 25, 2016

(30) Foreign Application Priority Data

Feb. 20, 2015   (JP) ................................. 2015-032059

(51) Int. Cl.
*H04L 5/14*       (2006.01)
*H04N 7/18*       (2006.01)

(52) U.S. Cl.
CPC ............... *H04N 7/186* (2013.01); *H04L 5/14* (2013.01)

(58) Field of Classification Search
CPC ...................................................... H04N 7/186
See application file for complete search history.

(56) References Cited

U.S. PATENT DOCUMENTS

| 2010/0027446 | A1* | 2/2010 | Choi ..................... H04L 5/0053 370/280 |
| 2012/0075984 | A1* | 3/2012 | Cendrillon ............... H04B 3/32 370/201 |
| 2015/0055449 | A1* | 2/2015 | Li ......................... H04L 1/0072 370/216 |

FOREIGN PATENT DOCUMENTS

| JP | 03-280738 | 12/1991 |
| JP | 2005-151384 | 6/2005 |

(Continued)

OTHER PUBLICATIONS

The Extended European Search Report dated Jul. 4, 2016 for the related European Patent Application No. 15196265.1.

(Continued)

*Primary Examiner* — John Blanton
(74) *Attorney, Agent, or Firm* — Greenblum & Bernstein, P.L.C.

(57) ABSTRACT

There is provided an intercom system which realizes high-quality image display and communication with low cost.
In the intercom system, front door slave unit 300 having an attached camera and master unit 400 are connected to each other through a two-wire cable, and communication between front door slave unit 300 and master unit 400 is performed with transmission and reception of an image signal. Front door slave unit 300 packetizes a control signal, an image signal, and a sound signal of front door slave unit 300, generates an uplink signal, and transmits the generated uplink signal to master unit 400. Master unit 400 packetizes a control signal and a sound signal of master unit 400, generates a downlink signal, and transmits the generated downlink signal to front door slave unit 300. Front door slave unit 300 and master unit 400 perform transmission of (Continued)

the uplink signal and transmission of the downlink signal in a manner of time division duplex using the two-wire cable.

6 Claims, 10 Drawing Sheets

(56) References Cited

FOREIGN PATENT DOCUMENTS

| JP | 2005-294929 | 10/2005 |
|---|---|---|
| JP | 2007-124227 | 5/2007 |
| JP | 2007-194783 | 8/2007 |
| JP | 2007-202120 | 8/2007 |
| JP | 2013-046203 | 3/2013 |
| WO | 2007/060014 | 5/2007 |

OTHER PUBLICATIONS

Kato M et al: "Visual Communication System in an Apartment House Using Only Twisted Paired Cable", IEEE Transactions on Consumer Electronics, IEEE Service Center, New York, NY, US, vol. 40, No. 3, Aug. 1, 1994 (Aug. 1, 1994), pp. 418-426, XP000471202.

Wikipedia: "Duplex (Telecommunications)", Wikipedia, Jan. 12, 2015 (Jan. 12, 2015), XP002758806, Retrieved from the Internet: URL:https://en.wikipedia.org/w/index. php?title=Duplex_%28telecommunications%29 &oldid=642120925 [retrieved on Jun. 15, 2016].

* cited by examiner

INTERCOM SYSTEM AND COMMUNICATION METHOD

BACKGROUND OF THE INVENTION

1. Field of the Invention

The present disclosure relates to an intercom system that includes a front door slave unit having an attached camera and a master unit, and a communication method of the intercom system.

2. Description of the Related Art

An intercom system which performs a telephone conversation between a front door slave unit and a master unit has been widespread used. The front door slave unit is disposed at the front door and the master unit is disposed in the room. Recently, a change of such an intercom system to a so-called television intercom system attracts attention. In the television intercom system, an image of the front door can be displayed in the master unit.

In the conventional intercom system that does not transmit an image signal, analog transmission using a two-wire cable is employed in many cases. When the intercom system is changed, if using of the two-wire cable which has been already provided is possible, high advantages in terms of time or cost are obtained. In a case of the television intercom system, if an increase of the quantity of transmitted data due to an image signal is considered, digital transmission is more appropriate than the analog transmission.

For example, an intercom system that performs digital transmission for a signal by using the two-wire cable is disclosed in Japanese Patent Unexamined Publication No. 2007-124227.

In the technology (hereinafter, "the related art") disclosed in Japanese Patent Unexamined Publication No. 2007-124227, a front door slave unit performs digital modulation in a state where a control signal, an image signal, and a sound signal of the front door slave unit are packetized, and the front door slave unit transmits a result of digital modulation to the master unit. The master unit performs digital modulation in a state where a control signal and a sound signal of the master unit are packetized, and the master unit transmits a result of digital modulation to the front door slave unit. At this time, the front door slave unit and the master unit perform digital modulation by using different frequency bands, and thus full duplex communication is realized.

According to such a related art, it is possible to perform a change to the television intercom system by using the two-wire cable which has been already provided.

SUMMARY OF THE INVENTION

According to the present disclosure, there is provided an intercom system that includes a front door slave unit which has an attached camera, and a master unit which is connected to the front door slave unit having the attached camera through a two-wire cable. The front door slave unit packetizes a control signal, an image signal, and a sound signal of the front door slave unit, generates an uplink signal, and transmits the generated uplink signal to the master unit. The master unit packetizes a control signal and a sound signal of the master unit, generates a downlink signal, and transmits the generated downlink signal to the front door slave unit. The front door slave unit and the master unit perform transmission of the uplink signal and transmission of the downlink signal in a manner of time division duplex using the two-wire cable.

DETAILED DESCRIPTION OF THE PREFERRED EMBODIMENT

Before an exemplary embodiment of the present invention is described, problems of the related art will be simply described. In the related art, regarding an uplink signal transmitted to the master unit and a downlink signal transmitted to the front door slave unit, since it is necessary that frequency bands to be used are distinguished, processing of each device becomes complicated and a circuit configuration becomes complex. Thus, cost for each device becomes high and an advantage in cost, which is obtained by using the two-wire cable which has been already provided is lost. That is, the related art has a problem in that realization of high-quality image display and a telephone conversation with low cost is difficult.

Hereinafter, an exemplary embodiment of the present disclosure will be described in detail with reference to the accompanying drawings.

Outline of System

First, an outline of an intercom system according to the exemplary embodiment of the present disclosure will be described.

Figure 1:
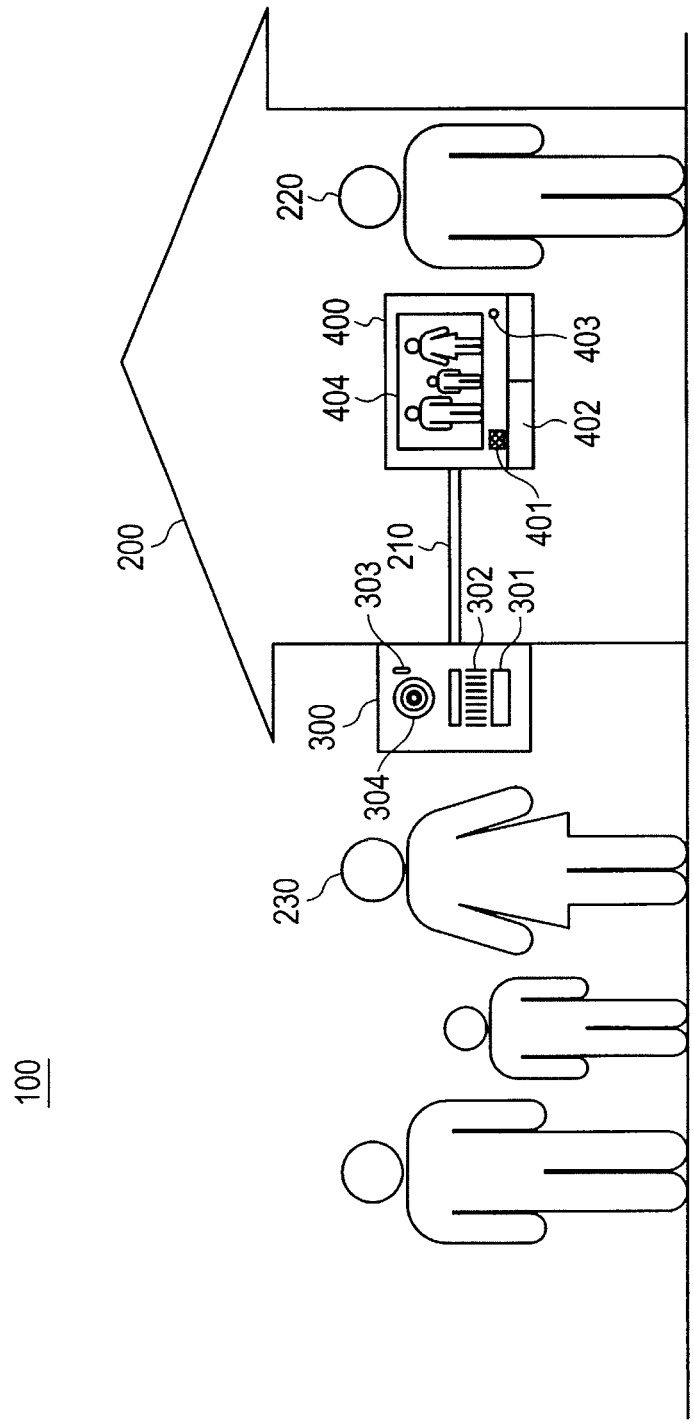
FIG. 1 is a system configuration diagram illustrating an example of a configuration of an intercom system according to an exemplary embodiment of the present disclosure.

FIG. 1 is a system configuration diagram illustrating an example of a configuration of an intercom system according to this exemplary embodiment.

In FIG. 1, intercom system 100 includes front door slave unit 300 and master unit 400, for example. Front door slave unit 300 is disposed at the front door of building 200. Master unit 400 is disposed in the room of building 200. Two-wire cable 210 is constructed between front door slave unit 300 and master unit 400. Two-wire cable 210 is formed from a pair of copper lines. Two-wire cable 210 is, for example, a communication cable which has been installed in building 200 formerly and is used in an intercom system in which an image signal is not transmitted.

Front door slave unit 300 includes slave unit-side calling button 301, slave unit-side speaker 302, slave unit-side microphone 303, and slave unit-side digital camera 304. That is, front door slave unit 300 has a function to capture an image of the surroundings of the front door and to transmit the captured image to master unit 400, in addition to a function of calling and a telephone conversation.

Master unit 400 includes master unit-side speaker 401, master unit-side response button 402, master unit-side microphone 403, and master unit-side liquid crystal display 404. That is, master unit 400 has a function to display an image of the surroundings of the front door, which is transmitted from front door slave unit 300, in addition to a function of a response (start of a telephone conversation) to the calling and a telephone conversation.

In the following descriptions, a direction from the front door slave unit 300 to master unit 400 is referred to as "an upward direction", and a signal transmitted from front door slave unit 300 in the upward direction is referred to as "an uplink signal". A direction from master unit 400 to front door slave unit 300 is referred to as "a downward direction", and a signal transmitted from master unit 400 in the downward direction is referred to as "a downlink signal".

Such intercom system 100 can cause user 220 to talk with visitor 230 at the front door while the user confirms the appearance thereof with images. However, since a signal including an image signal is transmitted by using two-wire cable 210, an effort for a communication manner is required.

Thus, front door slave unit 300 and master unit 400 according to this exemplary embodiment performs encoding in a state where various types of data which are targets of transmission to the other party are packetized, and transmits a result of packetization to the other party in a manner of baseband transmission. At this time, front door slave unit 300 and master unit 400 perform baseband transmission in a manner of time division duplex (time division two-way transmission). That is, front door slave unit 300 and master unit 400 perform alternate switching between transmission and reception in accordance with lapse of time and perform transmission only in a section for which the other party does not perform transmission.

Figure 2:
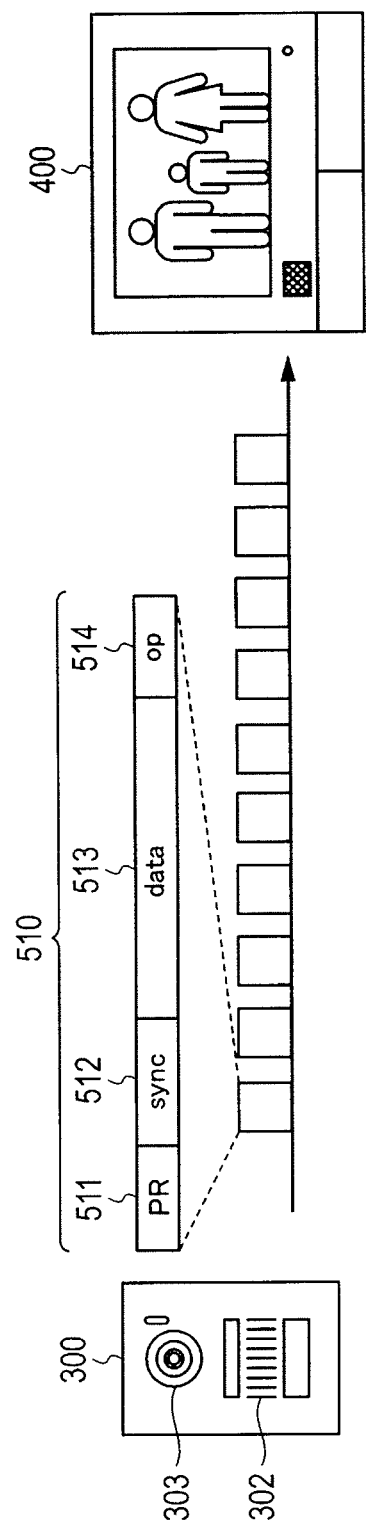
FIG. 2 is a diagram illustrating an example of a form of signal transmission in this exemplary embodiment.

FIG. 2 is a diagram illustrating a form in which various types of data are packetized and transmitted between front door slave unit 300 and master unit 400. Here, an uplink signal is illustrated. Packet data obtained by packetizing various signals is actually encoded and digitally transmitted, as described above.

As illustrated in FIG. 2, front door slave unit 300 sequentially generates many packets 510 and transmits the generated packets to master unit 400 at a predetermined timing. Each of packets 510 is configured from preamble portion (PR) 511, synchronization signal portion (sync) 512, data portion (data) 513, and option portion (op) 514. Various types of data are appropriately divided and are stored at data portion 513. The various types of data includes sound data of slave unit-side microphone 303, image data of slave unit-side digital camera 304, and the like, and are used as targets of transmission to master unit 400.

It is desired that front door slave unit 300 packetizes at least image data and other data such as control data and sound data into different packets. Thus, image data on master unit 400 side is easily demodulated and it is possible to reduce processing burden and improving processing rate.

Figure 3:
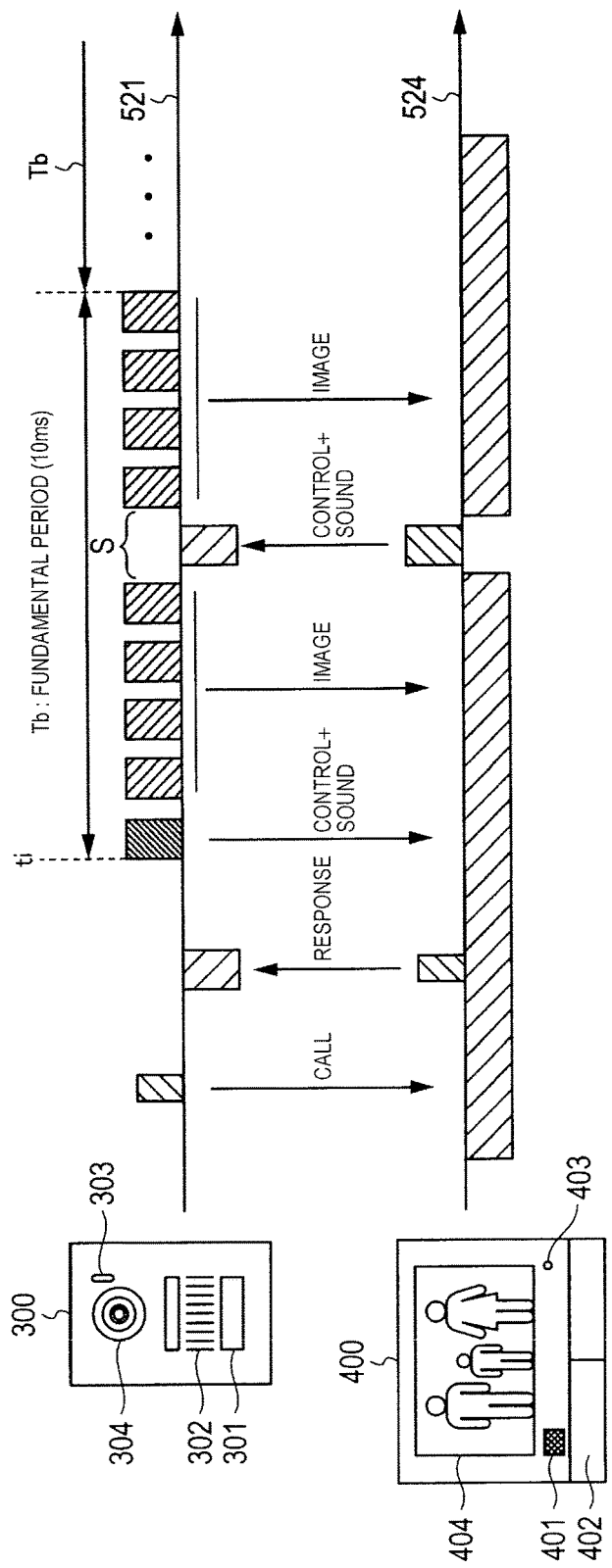
FIG. 3 is a diagram illustrating an example of a form of time division duplex in this exemplary embodiment.

FIG. 3 is a diagram illustrating an example of a form of time division duplex between front door slave unit 300 and master unit 400.

In FIG. 3, rectangle 522 disposed on an upper side of first line 521 indicates a section (referred to as "a slave unit-side transmission section" below) in which front door slave unit 300 can transmit the uplink signal. Rectangle 523 disposed on a lower side of first line 521 indicates a section in which front door slave unit 300 is to wait for reception of the downlink signal. A rectangle disposed on an upper side of second line 524 indicates a section (referred to as "a master unit-side transmission section" below) in which master unit 400 can transmit the downlink signal. Rectangle 526 disposed on a lower side of second line 524 indicates a section in which master unit 400 is to wait for reception of the uplink signal.

As illustrated in FIG. 3, first, master unit 400 is in a default state and waits for reception of an uplink signal. If slave unit-side calling button 301 is operated (pressed) by visitor 230, front door slave unit 300 transmits a calling signal and waits for reception of a downlink signal. Master unit 400 which has received the calling signal transmit a response signal (ACK) to front door slave unit 300 and causes master unit-side speaker 401 to output calling sound.

The calling signal and the response signal may be above-described packets 510 (see FIG. 2) or may be signals having other formats.

Front door slave unit 300 which has received the response signal performs transmission of packets including control data and sound data, transmission of packets including image data, and waiting for reception of a downlink signal, as illustrated in FIG. 3, in accordance with details which has been defined in advance and is regulated by transmission control information, for example. Similarly, master unit 400 which has transmitted the response signal performs transmission of packets including control data and sound data, and waiting for reception of an uplink signal, in accordance with details regulated by the transmission control information.

The transmission control information has been shared in advance between front door slave unit 300 and master unit 400, for example. For example, transmission control information is information for regulating time allocation of the slave unit-side transmission section (transmission section of an uplink signal) and master unit-side transmission section (transmission section of a downlink signal) in predetermined period (fundamental period) Tb which is set to 10 ms (milliseconds), and for regulating a reference timing ti which is used as a reference of period Tb. For example, period Tb is an interval at which transmission of one transmission and reception frame formed from a bundle of packets is repeated. The above descriptions are for an example of a synchronization system. However, an asynchronization system which performs transmission and reception if necessary, without regulated fundamental period Tb may be configured.

For example, the transmission control information regulates a timing after a predetermined period of time elapses from a point of time when a calling signal or a response signal is transmitted, as reference timing ti of period Tb. In this case, reference timing ti of period Tb is shared between front door slave unit 300 and master unit 400 by transmission and reception of the calling signal or the response signal, for example.

For example, the transmission control information regulates section S regulated by the transmission control information and timing ti in period Tb, as the master unit-side transmission section. The transmission control information regulates sections other than section S in period Tb, as the slave unit-side transmission section.

In this case, as illustrated in FIG. 3, for example, in the sections other than section S, master unit. 400 waits for reception of an uplink signal and front door slave unit 300 transmits packets including control data, sound data or image data as an uplink signal. In section S, front door slave unit 300 waits for reception of a downlink signal and master unit 400 transmits packets including control data or sound data as a downlink signal.

It is desired that front door slave unit 300 does not transmit sound data until master unit-side response button 402 is operated (pressed) by user 220 listening to the calling sound.

In this manner, front door slave unit 300 and master unit 400 separate communication path including two-wire cable 210 in a time domain and communicates with each other with various signals in a manner of time division duplex in which the transmission directions (upward/downward) are switched. Thus, a telephone conversation (referred to as "a telephone conversation with an image" below) is enabled while an image of the front door is transmitted and displayed.

In a case of such time division duplex, varying of a carrier frequency which is used in modulation and the like for an uplink signal and a downlink signal is not required. Accordingly, front door slave unit 300 and master unit 400 can perform baseband transmission with the same frequency, for example.

Configuration of Each Device

Next, a configuration of each of front door slave unit 300 and master unit 400 will be described.

Configuration of Front Door Slave Unit

Figure 4:
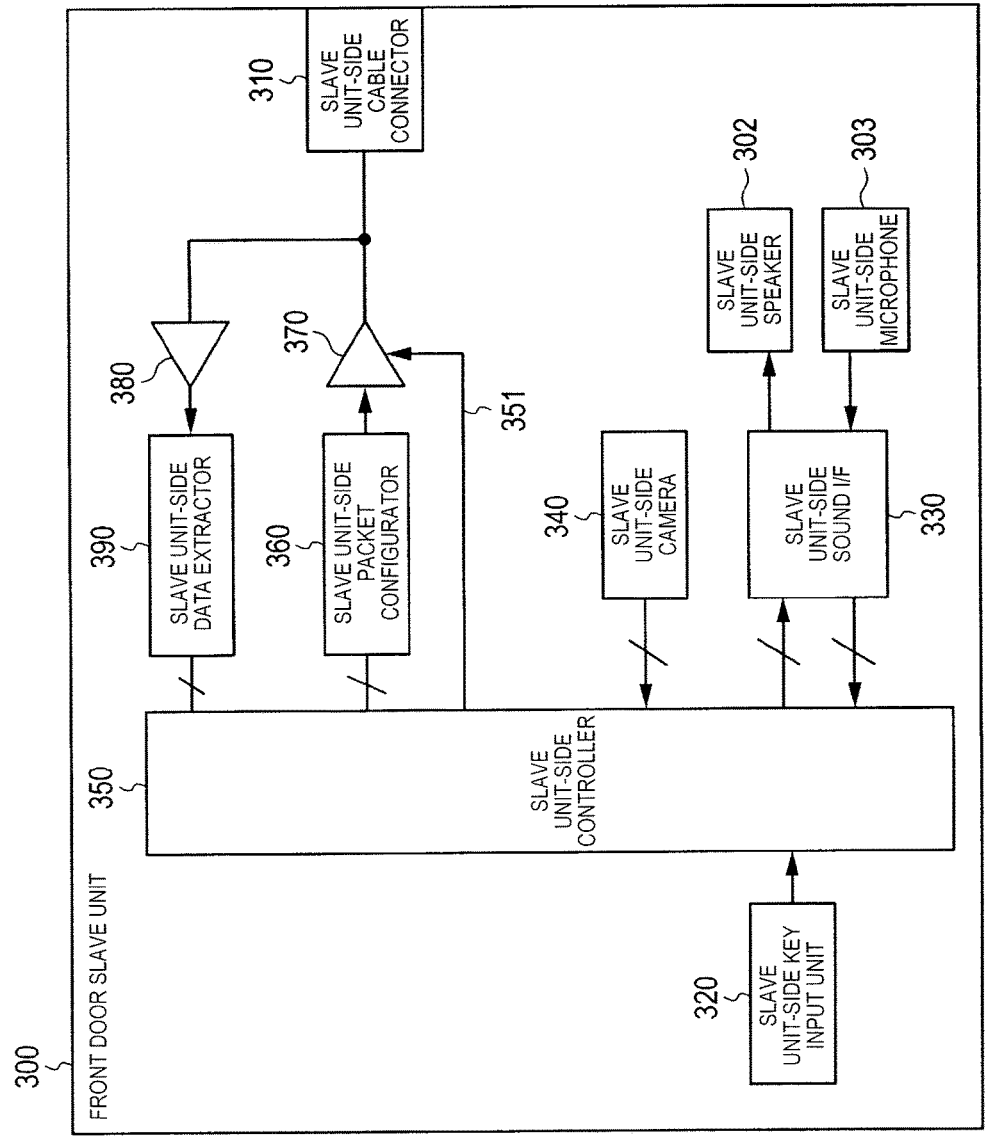
FIG. 4 is a block diagram illustrating an example of a configuration of a front door slave unit according to this exemplary embodiment.

FIG. 4 is a block diagram illustrating an example of a configuration of front door slave unit 300.

In FIG. 4, front door slave unit 300 includes slave unit-side cable connector 310, slave unit-side key input unit 320, slave unit-side speaker 302, slave unit-side microphone 303, slave unit-side sound I/F (interface) 330, and slave unit-side camera 340. The front door slave unit 300 includes slave unit-side controller 350, slave unit-side packet configurator 360, slave unit-side transmission driver 370, slave unit-side reception driver 380, and slave unit-side data extractor 390.

Slave unit-side cable connector 310 includes, for example, a connection terminal for the two-wire cable, and connects one end of two-wire cable 210 on the front door side with slave unit-side transmission driver 370 and slave unit-side reception driver 380 so as to be in a state where transmission of a signal is enabled.

Slave unit-side key input unit 320 includes above-described slave unit-side calling button 301. When slave unit-side calling button 301 is operated, slave unit-side key input unit 320 outputs a signal indicating a message thereof to slave unit-side controller 350.

Slave unit-side speaker 302 converts analog sound data output from slave unit-side sound I/F 330 into sound and outputs the sound.

Slave unit-side microphone 303 collects sound of the surroundings, converts sound into analog sound data, and outputs the analog sound data to slave unit-side sound I/F 330.

Slave unit-side sound I/F 330 converts digital sound data output from slave unit-side controller 350 into analog sound data, adjusts a signal level, and performs an output to slave unit-side speaker 302. Slave unit-side sound I/F 330 adjusts a signal level of analog sound data output from slave unit-side microphone 303, converts analog sound data having an adjusted signal level into digital sound data, and performs an output to slave unit-side controller 350. The analog/digital conversion is performed by an A/D converter or a D/A converter (not illustrated).

Slave unit-side sound I/F 330 may output data as digital sound data to slave unit-side controller 350. Predetermined sound compression processing is performed on data which is obtained by performing digital conversion on analog sound data output from slave unit-side microphone 303, and thereby the data as digital sound data is obtained. When digital sound data output from slave unit-side controller 350 is data obtained by performing predetermined sound compression processing, slave unit-side sound I/F 330 performs digital/analog conversion by performing predetermined sound expansion processing on the data.

Slave unit-side camera 340 includes above-described slave unit-side digital camera 304. Slave unit-side camera 340 captures an image of the front door, generates digital image data, and outputs the generated digital image data to slave unit-side controller 350. Slave unit-side camera 340 may have an encoder module mounted therein. That is, slave unit-side camera 340 may output data as digital image data to slave unit-side controller 350. Predetermined video compression processing of H.264 and the like is performed on image data output from slave unit-side digital camera 304 and thereby the data as digital image data is obtained.

When a signal indicating that slave unit-side calling button 301 is operated is output from slave unit-side key input unit 320, slave unit-side controller 350 transmits a calling signal (see FIG. 3) indicating a message thereof to master unit 400. The calling signal is transmitted through slave unit-side packet configurator 360, slave unit-side transmission driver 370, and slave unit-side cable connector 310, for example.

When a response signal (see FIG. 3) is received from master unit 400, slave unit-side controller 350 starts predetermined control processing (referred to as "slave unit-side telephone conversation control processing" below) in order to realize a telephone conversation with an image. The response signal is received through slave unit-side cable connector 310, slave unit-side reception driver 380, and slave unit-side data extractor 390, for example.

The slave unit-side telephone conversation control processing is performed by outputting digital sound data and digital image data which are output from slave unit-side sound I/F 330 and slave unit-side camera 340, to slave unit-side packet configurator 360. The slave unit-side telephone conversation control processing is performed by outputting digital sound data which has been output from master unit 400 side and is output from slave unit-side data extractor 390, to slave unit-side sound I/F 330.

Slave unit-side controller 350 holds the transmission control information which is described using FIG. 3, in advance. As illustrated in FIG. 3, slave unit-side controller 350 controls an operation of slave unit-side transmission driver 370 (and slave unit-side reception driver 380) such that transmission of an uplink signal and reception of a downlink signal is performed in a manner of time division. The control is performed, for example, by outputting enable signal 351 in accordance with the transmission control information. Enable signal 351 is set for controlling an operation (drive of a signal) of slave unit-side transmission driver 370 (and slave unit-side reception driver 380).

When the calling signal is transmitted, or when the response signal is received, slave unit-side controller 350 may control these device units such that operations of slave unit-side speaker 302, slave unit-side microphone 303, slave unit-side sound I/F 330, and slave unit-side camera 340 are started.

Slave unit-side controller 350 may output various types of control data regarding an operation of front door slave unit 300 or an operation of master unit 400, as data which is a target of transmission to master unit 400, to slave unit-side packet configurator 360. The control data includes, for example, sensing information of various sensor devices (not illustrated) which are included in front door slave unit 300, such as a temperature sensor, an illumination sensor, a human body sensor.

Slave unit-side packet configurator 360 appropriately divides digital sound data and digital image data (along with control data) output from slave unit-side controller 350 so as to perform packetization. Slave unit-side packet configurator 360 encodes the generated packet data and generates an uplink signal. Slave unit-side packet configurator 360 outputs the generated uplink signal to slave unit-side transmission driver 370. Details of a configuration of slave unit-side packet configurator 360 will be described later.

Slave unit-side transmission driver 370 buffers the uplink signal output from slave unit-side packet configurator 360, adjusts a signal level of the uplink signal, and transmits the uplink signal having the adjusted signal level to master unit 400 through slave unit-side cable connector 310. As illustrated in FIG. 3, slave unit-side transmission driver 370 sequentially transmits the buffered uplink signal in the slave unit-side transmission section which is regulated by the transmission control information. Switching between ON and OFF of transmission is performed, for example, based on above-described enable signal 351 output from slave unit-side controller 350.

Slave unit-side reception driver 380 adjusts a signal level of a downlink signal transmitted from master unit 400 through slave unit-side cable connector 310, buffers the downlink signal having the adjusted signal level, and outputs the buffered downlink signal to slave unit-side data extractor 390. As illustrated in FIG. 3, slave unit-side reception driver 380 receives the downlink signal in the master unit-side transmission section regulated by the transmission control information. Switching between a reception section and a non-reception section is performed, for example, based on above-described enable signal 351 output from slave unit-side controller 350. When slave unit-side data extractor 390 of the subsequent stage can distinguish downlink signals by using preambles and the like of packets, slave unit-side reception driver 380 may not necessarily stop a reception operation in the non-reception section.

A configuration of peripheral units of slave unit-side transmission driver 370 and slave unit-side reception driver 380 will be described later in detail.

Slave unit-side data extractor 390 extracts digital sound data of master unit 400 which is included in a downlink signal from the downlink signal output from slave unit-side reception driver 380, and outputs the extracted digital sound data to slave unit-side controller 350. A configuration of slave unit-side data extractor 390 will be described later in detail.

Transfer of data between the components of front door slave unit 300 is performed in a manner of digital transmission, excluding transfer of data between slave unit-side speaker 302 and slave unit-side microphone 303, and slave unit-side sound I/F 330.

Configuration of Master Unit

Figure 5:
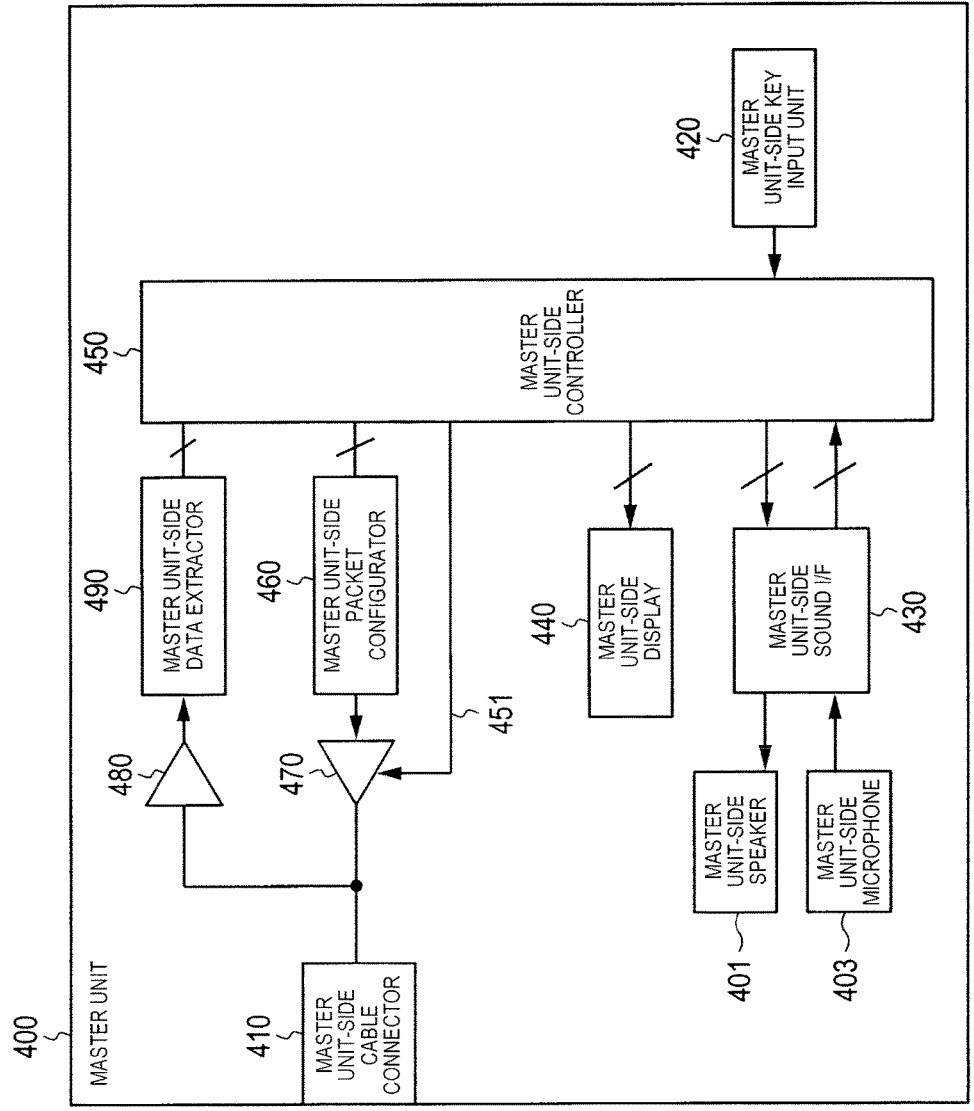
FIG. 5 is a block diagram illustrating an example of a configuration of a master unit according to this exemplary embodiment.

FIG. 5 is a block diagram illustrating an example of a configuration of master unit 400.

In FIG. 5, master unit 400 includes master unit-side cable connector 410, master unit-side key input unit 420, master unit-side speaker 401, master unit-side microphone 403, master unit-side sound I/F 430, and master unit-side display 440. Master unit 400 includes master unit-side controller 450, master unit-side packet configurator 460, master unit-side transmission driver 470, master unit-side reception driver 480, and master unit-side data extractor 490.

Master unit-side cable connector 410 includes, for example, a connection terminal for the two-wire cable, and connects one end of two-wire cable 210 on an indoor side with master unit-side transmission driver 470 and master unit-side reception driver 480 so as to be in a state where transmission of a signal is enabled.

Master unit-side key input unit 420 includes above-described master unit-side response button 402. When above-described master unit-side response button 402 is operated, master unit-side key input unit 420 outputs a signal indicating a message thereof to master unit-side controller 450.

Master unit-side speaker 401 converts analog sound data output from slave master unit-side sound I/F 430 into sound and outputs the sound.

Master unit-side microphone 403 collects sound of the surroundings, converts sound into analog sound data, and outputs the analog sound data to master unit-side sound I/F 430.

Master unit-side sound I/F 430 converts digital sound data output from master unit-side controller 450 into analog sound data, adjusts a signal level, and performs an output to master unit-side speaker 401. Master unit-side sound I/F 430 adjusts a signal level of analog sound data output from master unit-side microphone 403, converts analog sound data having an adjusted signal level into digital sound data, and performs an output to master unit-side controller 450. The analog/digital conversion is performed by an A/D converter or a D/A converter (not illustrated).

Master unit-side sound I/F 430 may output data as digital sound data to master unit-side controller 450. Predetermined sound compression processing is performed on data which is obtained by performing digital conversion on analog sound data output from master unit-side microphone 403, and thereby the data as digital sound data is obtained. When digital sound data output from master unit-side controller 450 is data obtained by performing predetermined sound compression processing, master unit-side sound I/F 430 performs digital/analog conversion by performing predetermined sound expansion processing on the data.

Master unit-side display 440 includes above-described master unit-side liquid crystal display 404. Master unit-side display 440 reproduces digital image data output from master unit-side controller 450 and displays images of the front door. When digital image data output from master unit-side controller 450 is data obtained by performing predetermined video compression processing, video display is performed by performing predetermined video expansion processing on the data.

When a calling signal (see FIG. 3) indicating that slave unit-side calling button 301 is operated is received from front door slave unit 300, master unit-side controller 450 transmits a response signal (see FIG. 3) to front door slave unit 300 and causes master unit-side speaker 401 to output predetermined calling sound. The calling signal is received through master unit-side cable connector 410, master unit-side reception driver 480, and master unit-side data extractor 490, for example. The response signal is transmitted through master unit-side packet configurator 460, master unit-side transmission driver 470, and master unit-side cable connector 410, for example. For example, master unit-side controller 450 outputs a digital sound signal of the predetermined calling sound to master unit-side sound I/F 430, and thus the calling sound is output.

Master unit-side controller 450 starts predetermined control processing (referred to as "master unit-side telephone conversation control processing" below) in order to realize a telephone conversation with an image.

The master unit-side telephone conversation control processing is performed by outputting digital sound data which is output from master unit-side sound I/F 430, to master unit-side packet configurator 460. The master unit-side telephone conversation control processing is performed by outputting digital sound data and digital image data which has been received from front door slave unit 300 side and is output from master unit-side data extractor 490, to slave unit-side sound I/F 330 and master unit-side display 440.

Master unit-side controller 450 holds the transmission control information which is described using FIG. 3, in advance. As illustrated in FIG. 3, master unit-side controller 450 controls an operation of master unit-side transmission driver 470 (and master unit-side reception driver 480) such that transmission of an uplink signal and reception of a downlink signal is performed in a manner of time division. The control is performed, for example, by outputting enable signal 451 in accordance with the transmission control information. Enable signal 451 is set for controlling an operation (drive of a signal) of master unit-side transmission driver 470 (and master unit-side reception driver 480).

It is desired that master unit-side controller 450 does not output digital sound data to master unit-side packet configurator 460 until a signal indicating that master unit-side response button 402 is operated is output from master unit-side key input unit 420.

When the calling signal is transmitted, or when the response signal is received, master unit-side controller 450 may control these device units such that operations of master unit-side speaker 401, master unit-side microphone 403, master unit-side sound I/F 430, and master unit-side display 440 are started.

Master unit-side controller 450 may output control data regarding an operation of front door slave unit 300 or an operation of master unit 400, as data which is a target of transmission to front door slave unit 300, to master unit-side packet configurator 460. The control data includes a control signal for master unit 400 controlling a camera operation (operation of a data rate, a pan, a tilt, light, a shutter, a filter, and the like) of front door slave unit 300 or for master unit 400 controlling various sensor devices which are included in front door slave unit 300, for example. The control data includes a control signal for controlling an operation of a device (electronic key of a door and the like) which is disposed outdoor, through a wireless communication circuit and the like (not illustrated) which are included in front door slave unit 300.

Master unit-side packet configurator 460 appropriately divides digital sound data and digital image data (along with control data) output from master unit-side controller 450 so as to perform packetization. Master unit-side packet configurator 460 encodes the generated packet data and generates a downlink signal. Master unit-side packet configurator 460 outputs the generated downlink signal to master unit-side transmission driver 470. Details of a configuration of master unit-side packet configurator 460 will be described later.

Master unit-side transmission driver 470 buffers the downlink signal output from master unit-side packet configurator 460, adjusts a gain of the downlink signal, and transmits the downlink signal having the adjusted gain to front door slave unit 300 through master unit-side cable connector 410. As illustrated in FIG. 3, master unit-side transmission driver 470 sequentially transmits the buffered downlink signal in the master unit-side transmission section which is regulated by the transmission control information. Switching between ON and OFF of transmission is performed, for example, based on above-described enable signal 451 output from master unit-side controller 450.

Master unit-side reception driver 480 adjusts a gain of an uplink signal transmitted from front door slave unit 300 through master unit-side cable connector 410, buffers the uplink signal having the adjusted gain, and outputs the buffered uplink signal to master unit-side data extractor 490. As illustrated in FIG. 3, master unit-side reception driver 480 receives the uplink signal in the slave unit-side transmission section regulated by the transmission control information. Switching between a reception section and a non-reception section is performed, for example, based on above-described enable signal 451 output from master unit-side controller 450. When master unit-side data extractor 490 of the subsequent stage can distinguish uplink signals by using preambles and the like of packets, master unit-side reception driver 480 may not necessarily stop a reception operation in the non-reception section.

A configuration of peripheral units of master unit-side transmission driver 470 and master unit-side reception driver 480 will be described later in detail.

Master unit-side data extractor 490 extracts digital sound data and digital image data of front door slave unit 300 which is included in a uplink signal from the uplink signal output from master unit-side reception driver 480, and outputs the extracted digital sound data and digital image data to master unit-side controller 450. A configuration of master unit-side data extractor 490 will be described later in detail.

Transfer of data between the components of master unit 400 is performed in a manner of digital transmission, excluding transfer of data between master unit-side speaker 401 and master unit-side microphone 403, and master unit-side sound I/F 430.

Configuration of Packet Configurator

Next, a configuration of slave unit-side packet configurator 360 and a configuration of master unit-side packet configurator 460 will be described in detail.

Since slave unit-side packet configurator 360 and master unit-side packet configurator 460 basically have the same configuration, these configurators are simply referred to as "packet configurators" and a configuration thereof will be collectively described. Positioning of slave unit-side transmission driver 370 against slave unit-side packet configurator 360 is similar to positioning of master unit-side transmission driver 470 against master unit-side packet configurator 460. Accordingly, here, slave unit-side transmission driver 370 and master unit-side transmission driver 470 are totally referred to as "transmission drivers".

Figure 6:
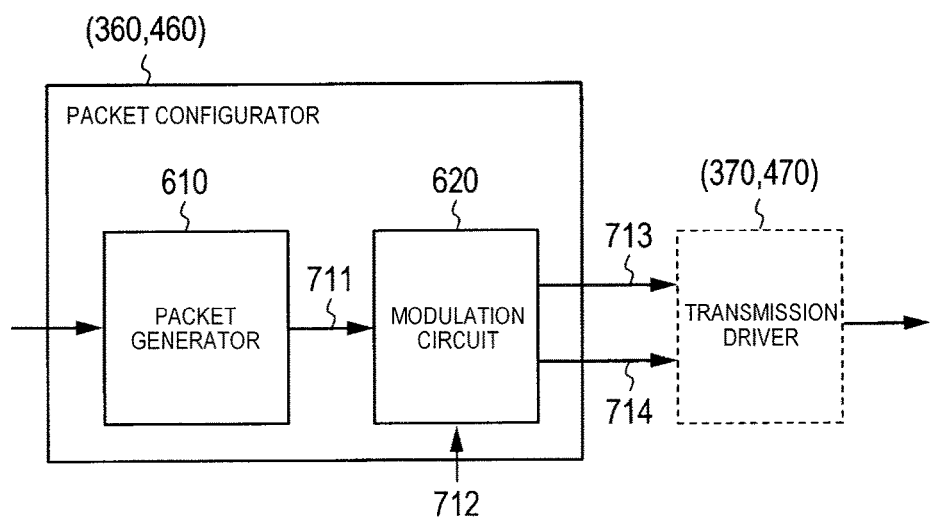
FIG. 6 is a block diagram illustrating an example of a configuration of a packet configurator and peripheral units in this exemplary embodiment.

FIG. 6 is a block diagram illustrating an example of a configuration of the packet configurator and the peripheral units thereof.

In FIG. 6, the packet configurator (360 and 460) includes packet generator 610 and modulation circuit 620.

Packet generator 610 appropriately divides digital sound data and image and sound data (along with control data) by a data length which allows easy handling. Packet generator 610 adds preamble portion 511, synchronization signal portion 512, option portion 514, and the like to each of pieces of divided data, and generates packets 510 by using the pieces of divided data as data portion 513 (see FIG. 2). Packet generator 610 outputs generated packet data 711 to modulation circuit 620.

Information for detecting a boarder of packets 510 is described in preamble portion 511 and synchronization signal portion 512 of each of packets 510. The following information is described in data portion 513: information indicating classification (image/sound/control) of stored data; data; information necessary for organizing plural pieces of divided data so as to restore the original data. Additional information such as an error correction code is described in option portion 514.

Modulation circuit 620 encodes packet data 711 output from packet generator 610 at a predetermined frequency by using clock signal (CLK) 712 which is output from a clock oscillation circuit (not illustrated) included in front door slave unit 300. Modulation circuit 620 outputs modulated signal (DATA) 713 obtained by the encoding to the transmission driver (370 and 470). More specifically, modulation circuit 620 causes an output signal to rise or fall, based on clock signal 712 by using a predetermined transmission code such as the Manchester code, every predetermined modulation period.

An operation of the transmission driver (370 and 470) at the subsequent stage may be controlled by modulation circuit 620, not slave unit-side controller 350 or master unit-side controller 450. In this case, for example, as illustrated in FIG. 8, modulation circuit 620 has packet data to be transmitted and outputs enable signal (ENABLE) 714 for allowing an operation to the transmission driver (370 and 470) in the slave unit-side transmission section regulated by the above-described transmission control information.

Figure 7:
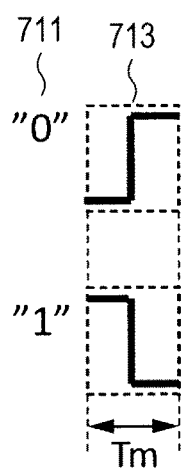
FIG. 7 is a diagram illustrating an example of a transmission code in this exemplary embodiment.

FIG. 7 is a diagram illustrating an example of the transmission code used by modulation circuit 620. Here, a case of employing the Manchester code is illustrated.

Modulation circuit 620 generates one signal corresponding to one bit of packet data 711 every period Tm and outputs the generated signal. When the Manchester code is employed, as illustrated in FIG. 7, modulation circuit 620 generates one rising signal corresponding to a value "0" of packet data 711 and outputs the generated one uplink signal as modulated signal 713. Modulation circuit 620 generates one falling signal corresponding to a value "1" of packet data 711 and outputs the generated one uplink signal as modulated signal 713.

Figure 8:
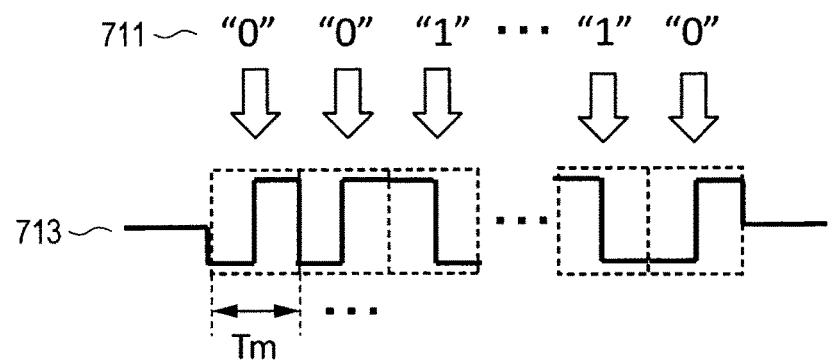
FIG. 8 is a diagram illustrating an example of a form of encoding in this exemplary embodiment.

FIG. 8 is a diagram illustrating an example of a form of encoding packet data.

For example, an output of packet data 711 of "0, 0, 1, . . . , 1, 0" is assumed. Modulation circuit 620 outputs modulated signal 713 which has a rising signal or a falling signal every period Tm corresponding to a value of each bit of packet data 711, as illustrated in FIG. 8.

Configuration of Data Extractor

Next, a configuration of slave unit-side data extractor 390 and a configuration of master unit-side data extractor 490 will be described in detail.

Since slave unit-side data extractor 390 and master unit-side data extractor 490 basically have the same configuration, these extractors are simply referred to as "data extractors" and a configuration thereof will be collectively described. Positioning of slave unit-side reception driver 380 against slave unit-side data extractor 390 is similar to positioning of master unit-side reception driver 480 against master unit-side data extractor 490. Accordingly, here, slave unit-side reception driver 380 and master unit-side reception driver 480 are totally referred to as "reception drivers".

Figure 9:
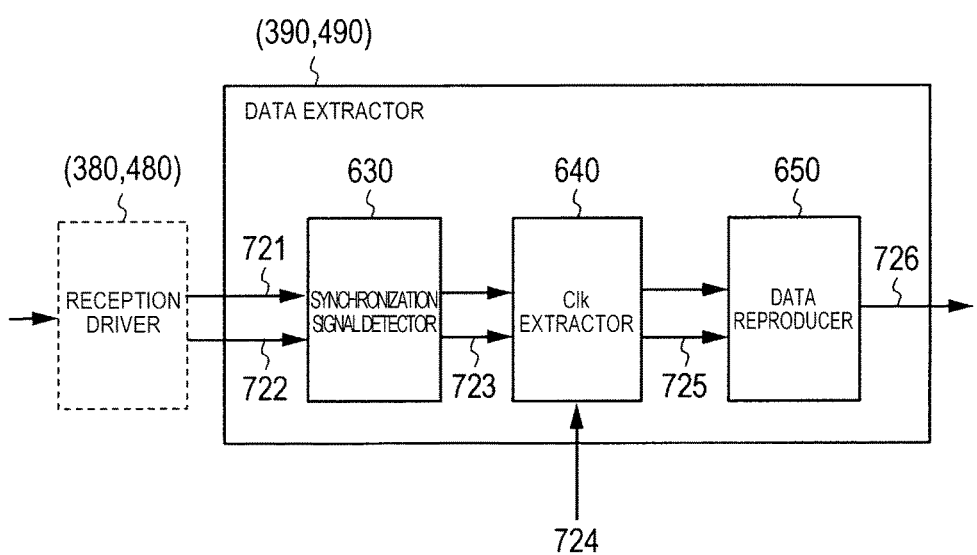
FIG. 9 is a block diagram illustrating an example of a configuration of a data extractor and peripheral units in this exemplary embodiment.

FIG. 9 is a block diagram illustrating an example of a configuration of the data extractor and the peripheral units thereof.

In FIG. 9, the data extractor (390 and 490) includes synchronization signal detector 630, Clk extractor 640, and data reproducer 650.

Modulated signal 721 output to synchronization signal detector 630 from the reception driver (380 and 480) of the previous stage is transmitted to synchronization signal detector 630 and Clk extractor 640, and is output to data reproducer 650.

Synchronization signal detector 630 compares modulated signal 721 output from the reception driver (380 and 480) with a predetermined synchronization signal pattern and thus detects a starting position of subsequent data.

The reception driver (380 and 480) at the previous stage may detect an effective signal level based on preamble portion 511 (see FIG. 2) in the received modulated signal and control an operation of synchronization signal detector 630 in accordance with a detection result. In this case, the reception driver (380 and 480) outputs received modulated signal (DATA) 721, for example, to synchronization signal detector 630, and the reception driver (380 and 480) outputs enable signal (ENABLE) 722 for allowing an operation, only when preamble portion 511 is detected at a signal level which is equal to or higher than a predetermined signal level.

For example, the reception driver (380 and 480) sets an operation of synchronization signal detector 630 to be Enable for a period of time when the device itself does not perform transmission. The reception driver (380 and 480) sets an operation of synchronization signal detector 630 to be Enable for a period of time when transmission from the other party destination in communication is performed. The reception driver (380 and 480) may perform determination based on a detection of preamble portion 511 (see FIG. 2).

The reception driver (380 and 480) may output an enable signal to the units at the subsequent stages other than synchronization signal detector 630, similarly. The enable signal may be input to the reception driver (380 and 480) in accordance with determination which the transmission section is the slave unit-side transmission section or the master unit-side transmission section.

Synchronization signal detector 630 outputs timing signal 723 indicating a starting position of the detected packet to Clk extractor 640.

Clk extractor 640 generates data clock (DATACLK) 725 based on modulated signal 721 and timing signal 723 which are output from synchronization signal detector 630, by using high-speed clock signal (CLK) 724 output from a clock oscillation circuit (not illustrated) which is included in front door slave unit 300. Clk extractor 640 outputs generated data clock 725 to data reproducer 650.

Data clock 725 is a signal indicating a timing of each bit in modulated signal 721. Data clock 725 has the same frequency as a frequency used in generation of modulated signal 721 by modulation circuit 620 of the other party destination in communication.

Data reproducer 650 includes a demodulation circuit for a modulated signal and demodulates the modulated signal. More specifically, data reproducer 650 demodulates packet data from modulated signal 721 by using data clock 725 which is output from Clk extractor 640 and reproduces original data 726 such as digital sound data and digital image data, from the demodulated packet data. The data size of data to be demodulated may be defined by described details of the packet data or may have a predetermined fixed value.

Figure 10:
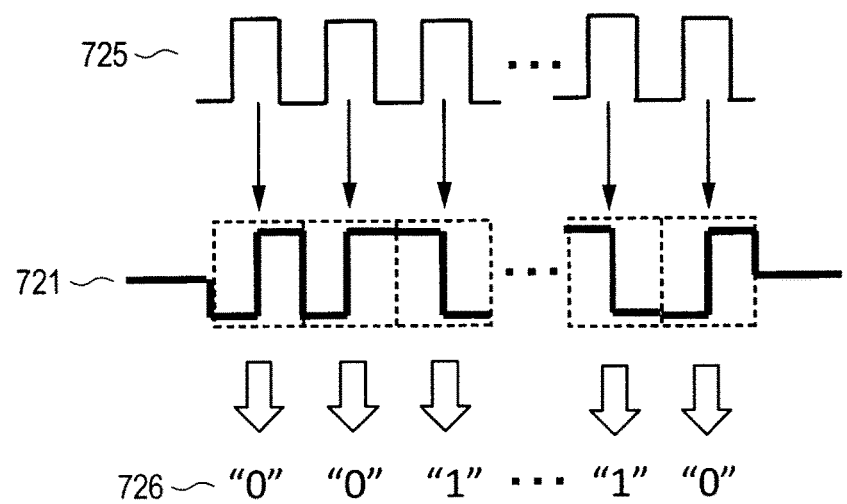
FIG. 10 is a diagram illustrating an example of a form of demodulation of a modulated signal in this exemplary embodiment.

FIG. 10 is a diagram illustrating an example of a form of demodulating a modulated signal by using the Manchester code.

Data reproducer 650 detects a rising signal and a falling signal of modulated signal 721 based on data clock 725 from Clk extractor 640. Data reproducer 650 outputs digital data 726 obtained by arranging "0s" and "1s" in accordance with a sequence of the detected rising signal or falling signal.

Configuration of Transmission and Reception Driver

Next, a configuration of slave unit-side transmission driver 370 and slave unit-side reception driver 380, and peripheral units thereof (referred to as "a transmission and reception driver of front door slave unit 300" below) will be described. A configuration of master unit-side transmission driver 470 and master unit-side reception driver 480, and peripheral units thereof (referred to as "a transmission and reception driver of master unit 400 below) will be described in detail.

Since slave unit-side transmission driver 370 and master unit-side transmission driver 470 basically have the same configuration, these drivers are simply referred to as "transmission drivers". Since slave unit-side reception driver 380 and master unit-side reception driver 480 basically have the same configuration, these drivers are simply referred to as "reception drivers". The transmission driver and the reception driver along with the peripheral units thereof are referred to as "a transmission and reception driver".

Figure 11:
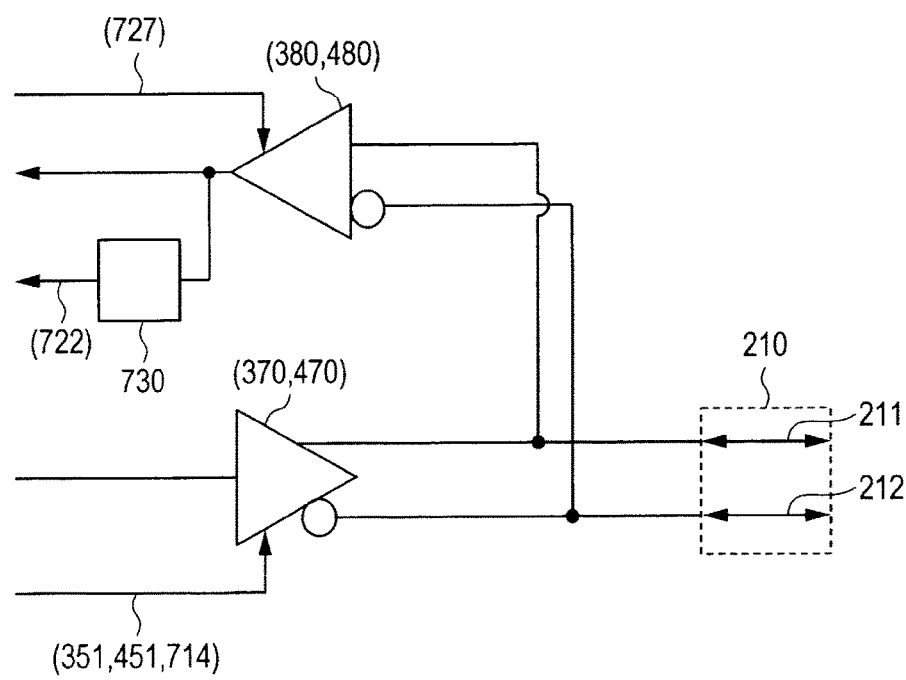
FIG. 11 is a configuration diagram illustrating an example of a configuration of a transmission and reception driver in this exemplary embodiment.

FIG. 11 is a block diagram illustrating an example of a configuration of the transmission and reception driver.

As illustrated in FIG. 11, each of the transmission driver (370 and 470) and reception driver (380 and 480) is connected with both of two copper lines 211 and 212 of two-wire cable 210. The transmission driver (370 and 470) and reception driver (380 and 480) perform a transmission operation and a reception operation in a manner of time division, as described above.

The time division operation is realized, for example, by an input of the enable signal (351, 451, and 714) to the transmission driver (370 and 470) or by an output of an enable signal (722) from preamble detection circuit 730 which is disposed on an output side of the reception driver (380 and 480). As described above, an enable signal (727) may be input to the reception driver (380 and 480).

Preamble detection circuit 730 provided on the output side of the reception driver (380 and 480) is a circuit for detecting above-described preamble portion 511. Preamble detection circuit 730 may be provided as a portion of the reception driver (380 and 480).

Not the enable signal, but a disable signal for forbidding an operation may be input to the transmission driver (370 and 470), the reception driver (380 and 480), or the subsequent stage to the reception driver (380 and 480) in a section in which an operation is disable.

With such a configuration, the transmission driver (370 and 470) and the reception driver (380 and 480) share two-wire cable 210 and perform transmission and reception of a signal. Thus, in intercom system 100, it is possible to commonly use two-wire cable 210 in transmission of an uplink signal and transmission of a downlink signal, without separation of a frequency band to be used.

Front door slave unit 300 and master unit 400 includes, for example, a central processing unit (CPU), a storage medium such as a read only memory (ROM) in which a control program is stored, a working memory such as a random access memory (RAM), and a communication circuit which are not illustrated. In this case, a function of each of the units is realized by the CPU executing the control program.

Intercom system 100 having such a configuration can perform digital transmission of an uplink signal and digital transmission of a downlink signal between front door slave unit 300 having an attached camera and master unit 400 in a manner of time division duplex using two-wire cable 210.

Operation of Each Device

Next, an operation of each of the devices will be described.

Operation of Front Door Slave Unit

Figure 12:
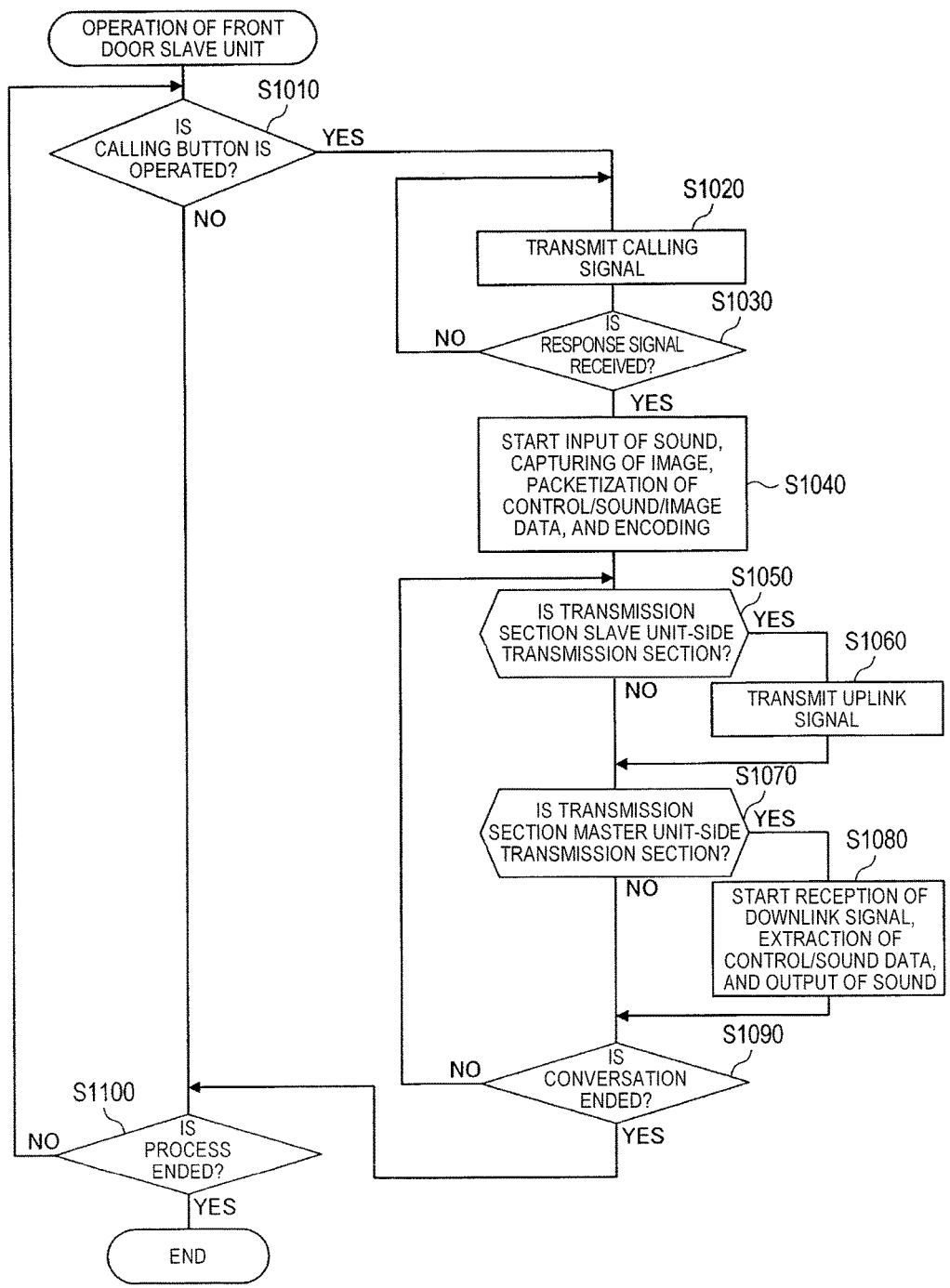
FIG. 12 is a flowchart illustrating an example of an operation of the front door slave unit in this exemplary embodiment.

FIG. 12 is a flowchart illustrating an example of an operation of front door slave unit 300.

In Step S1010, slave unit-side controller 350 determines whether or not slave unit-side calling button 301 is operated. When slave unit-side calling button 301 is operated (YES in S1010), slave unit-side controller 350 causes the process to proceed to Step S1020. When slave unit-side calling button 301 is not operated (NO in S1010), slave unit-side controller 350 causes the process to proceed to Step S1100 (which will be describe later).

In Step S1020, slave unit-side controller 350 transmits a calling signal to master unit 400.

In Step S1030, slave unit-side controller 350 determines whether or not a response signal is received from master unit 400. When the response signal is not received (NO in S1030), slave unit-side controller 350 causes the process to return to Step S1020. When the response signal is received (YES in S1030), slave unit-side controller 350 causes the process to proceed to Step S1040. When the response signal is not received even though the calling signal is transmitted a predetermined times, slave unit-side controller 350 may cause the process to proceed to Step S1100 (which will be described later).

In Step S1040, slave unit-side controller 350 starts an input of sound and capturing of an image by using slave unit-side microphone 303, slave unit-side sound I/F 330, and slave unit-side camera 340. Slave unit-side controller 350 starts packetization and encoding of various types of data (control data/digital sound data/digital image data) to be transmitted, by using slave unit-side packet configurator 360. Slave unit-side controller 350 may control a transmission rate of digital sound data and digital image data.

In Step S1050, slave unit-side controller 350 determines whether or not the transmission section is the slave unit-side transmission section. The determination is performed, for example, based on time allocation of the slave unit-side transmission section in the period Tb regulated by the transmission control information, and a start timing of the period Tb which is based on reference timing ti. When the transmission section is the slave unit-side transmission section (YES in S1050), slave unit-side controller 350 causes the process to proceed to Step S1060. When the transmission section is not the slave unit-side transmission section (NO in S1050), slave unit-side controller 350 causes the process to proceed to Step S1070 (which will be described later).

In Step S1060, slave unit-side controller 350 transmits an uplink signal which is generated by encoding to master unit 400 through two-wire cable 210 by using slave unit-side transmission driver 370. When the slave unit-side transmission section is ended, slave unit-side controller 350 stops transmission of the uplink signal.

In Step S1070, slave unit-side controller 350 determines whether or not the transmission is the master unit-side transmission section. The determination is performed, for example, based on time allocation of the master unit-side transmission section in the period Tb regulated by the transmission control information, and a start timing of the period Tb which is based on reference timing ti. When the transmission section is the master unit-side transmission section (YES in S1070), slave unit-side controller 350 causes the process to proceed to Step S1080. When the transmission section is not the master unit-side transmission section (NO in S1070), slave unit-side controller 350 causes the process to proceed to Step S1090 (which will be described later).

In Step S1080, slave unit-side controller 350 starts reception of a downlink signal, extraction of various types of data (control data/sound data), and an output of sound by using slave unit-side reception driver 380, slave unit-side data extractor 390, slave unit-side sound I/F 330, and slave unit-side speaker 302. When the master unit-side transmission section is ended, slave unit-side controller 350 stops reception of the downlink signal or extraction of various types of data.

In Step S1090, slave unit-side controller 350 determines whether or not a telephone conversation between front door slave unit 300 and master unit 400 is ended. For example, when a signal indicating that an operation of ending the telephone conversation is performed in master unit 400 is received from master unit 400, slave unit-side controller 350 determines that the telephone conversation is ended. When the telephone conversation is not ended (NO in S1090), slave unit-side controller 350 causes the process to return to Step S1050. When the telephone conversation is ended (YES in S1090), slave unit-side controller 350 causes the process to proceed to Step S1100.

In Step S1100, slave unit-side controller 350 determines whether an instruction of ending the process relating to an intercom function is received. For example, when a signal indicating that an operation of stopping the intercom function is performed in master unit 400 is received from master unit 400, slave unit-side controller 350 determines that the instruction of ending the process is received. When the instruction of ending the process is not received (NO in S1100), slave unit-side controller 350 causes the process to return to Step S1010. When the instruction of ending the process is received (YES in S1100), slave unit-side controller 350 ends a series of the processes.

Operation of Master Unit

Figure 13:
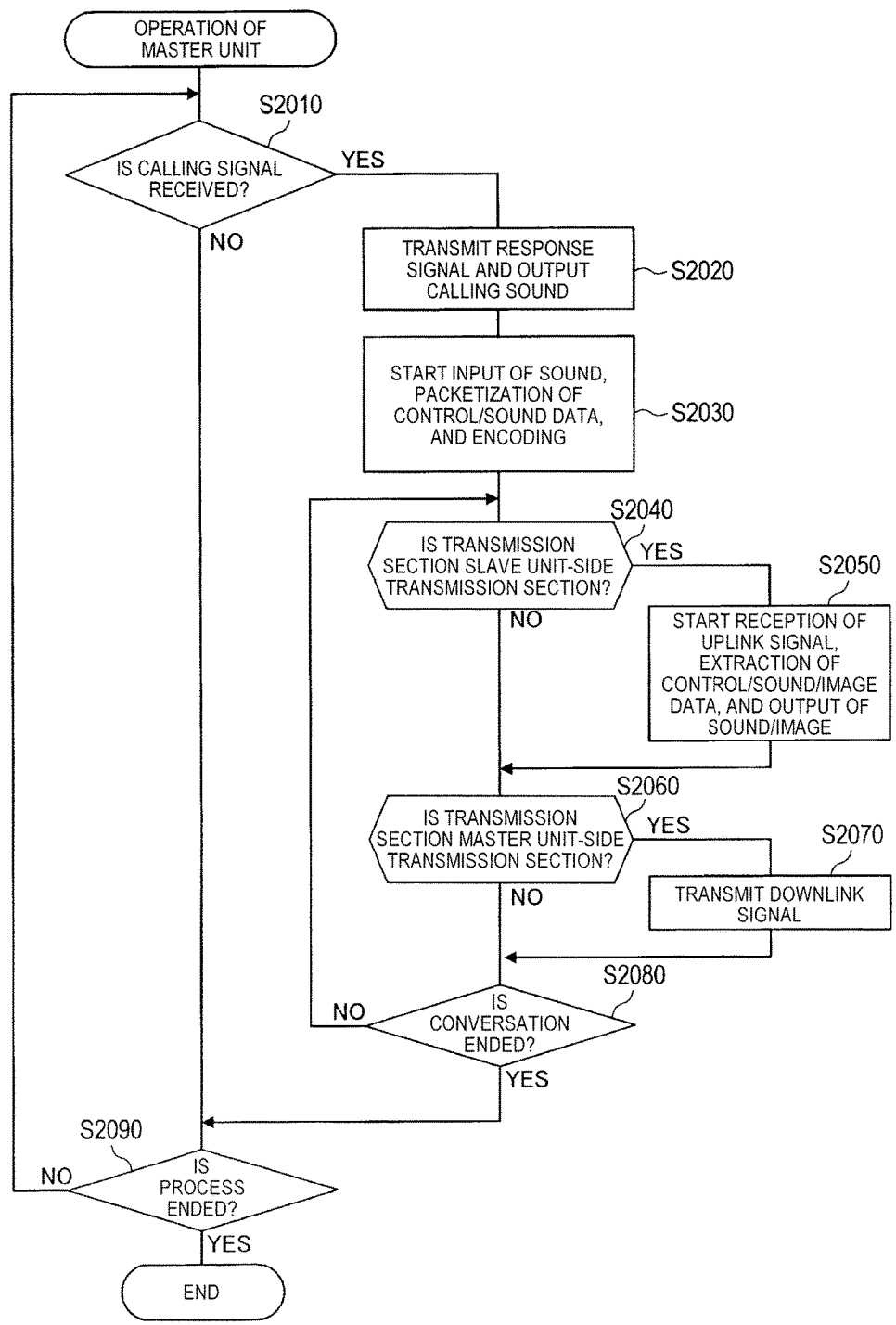
FIG. 13 is a flowchart illustrating an example of an operation of the master unit in this exemplary embodiment.

FIG. 13 is a flowchart illustrating an example of an operation of master unit 400.

In Step S2010, master unit-side controller 450 determines whether or not a calling signal is received from front door slave unit 300. When the calling signal is received (YES in S2010), master unit-side controller 450 causes the process to proceed to Step S2020. When the calling signal is not received (NO in S2010), master unit-side controller 450 causes the process to proceed to Step S2090 (which will be described later).

In Step S2020, master unit-side controller 450 transmits a response signal to front door slave unit 300, and outputs calling sound by using master unit-side sound I/F 430 and master unit-side speaker 401.

In Step S2030, master unit-side controller 450 starts an input of sound by using master unit-side microphone 403 and master unit-side sound I/F 430. Master unit-side controller 450 starts packetization and encoding of various types of data (control data/digital sound data/digital image data) to be transmitted, by using master unit-side packet configurator 460. Master unit-side controller 450 may control a transmission rate of digital sound data and digital image data.

In Step S2040, master unit-side controller 450 determines whether or not the transmission section is the slave unit-side transmission section. The determination is performed, for example, based on time allocation of the slave unit-side transmission section in the period Tb regulated by the transmission control information, and a start timing of the period Tb which is based on reference timing ti. When the transmission section is the slave unit-side transmission section (YES in S2040), master unit-side controller 450 causes the process to proceed to Step S2050. When the transmission section is not the slave unit-side transmission section (NO in S2040), slave unit-side controller 350 causes the process to proceed to Step S2060 (which will be described later).

In Step S2050, master unit-side controller 450 starts reception of an uplink signal and extraction of various types of data (control data/sound data/image data) by using master unit-side reception driver 480 and master unit-side data extractor 490. Master unit-side controller 450 starts an output of sound and images by using master unit-side sound I/F 430, slave unit-side speaker 302, and master unit-side liquid crystal display 404. When the slave unit-side transmission section is ended, master unit-side controller 450 stops reception of the uplink signal or extraction of various types of data.

In Step S2060, master unit-side controller 450 determines whether or not the transmission is the master unit-side transmission section. The determination is performed, for example, based on time allocation of the master unit-side transmission section in the period Tb regulated by the transmission control information, and a start timing of the period Tb which is based on reference timing ti. When the transmission section is the master unit-side transmission section (YES in S2060), master unit-side controller 450 causes the process to proceed to Step S2070. When the transmission section is not the master unit-side transmission section (NO in S2060), master unit-side controller 450 causes the process to proceed to Step S2080 (which will be described later).

In Step S2070, master unit-side controller 450 transmits a downlink signal by encoding to front door slave unit 300 through two-wire cable 210 by using master unit-side transmission driver 470. As described above, it is desired that master unit-side controller 450 does not transmit digital sound data until master unit-side response button 402 is operated. When the master unit-side transmission section is ended, master unit-side controller 450 stops transmission of the downlink signal.

In Step S2080, master unit-side controller 450 determines whether or not a telephone conversation between front door slave unit 300 and master unit 400 is ended. For example, when it is detected that an operation of ending a telephone conversation is performed in master unit 400, master unit-side controller 450 determines that the telephone conversation is ended. When the operation of ending the telephone conversation is performed, it is desired that master unit-side controller 450 transmits a signal indicating a message thereof to front door slave unit 300. When the telephone conversation is not ended (NO in S2080), master unit-side controller 450 causes the process to proceed to Step S2040. When the telephone conversation is ended (YES in S2080), master unit-side controller 450 causes the process to proceed to Step S2090.

In Step S2090, master unit-side controller 450 determines whether an instruction of ending the process relating to an intercom function is received. For example, when it is detected that an operation of stopping the intercom function is performed in master unit 400, it is determined that an instruction of ending the process is received. When the operation of stopping the intercom function is performed, it is desired that master unit-side controller 450 transmits a signal indicating a message thereof to front door slave unit 300. When the instruction of ending the process is not received (NO in S2090), master unit-side controller 450 causes the process to return to Step S2010. When the instruction of ending the process is received (YES in S2090), master unit-side controller 450 ends a series of the processes.

The devices perform such operations, and thereby intercom system 100 can perform digital transmission of an uplink signal and digital transmission of a downlink signal between front door slave unit 300 having an attached camera and master unit 400 in a manner of time division duplex using two-wire cable 210.

Advantages of this Exemplary Embodiment

As described above, intercom system 100 according to this exemplary embodiment performs digital transmission of an uplink signal and digital transmission of a downlink signal between front door slave unit 300 having an attached camera and master unit 400 in a manner of time division duplex using two-wire cable 210. Thus, in intercom system 100, it is not necessary that each of the uplink signal toward the master unit and the downlink signal toward the front door slave unit is modulated and demodulated of by using different frequency bands, contrarily to the related art. That is, intercom system 100 can complete the process of each of the devices with simple processing, and thus it is possible to simplify a circuit configuration.

Accordingly, since intercom system 100 can perform digital transmission in a state where cost of the devices is suppressed, by using the known two-wire cable, it is possible to realize high-quality image display and telephone conversation with low cost.

Intercom system 100 according to this exemplary embodiment performs encoding and then transmission of data in a manner of baseband transmission. Thus, it is possible to cause a synchronization signal to be included in a signal to be transmitted itself, to simplify a device configuration, and to reduce cost.

Since intercom system 100 according to this exemplary embodiment does not have a need for separating the frequency band for the uplink signal and the downlink signal, it is possible to effectively use the frequency band and to improve image quality and sound quality more, in comparison to the related art.

Modification Example of this Exemplary Embodiment

The type and the format of data which is transmitted in a manner of time division communication using the two-wire cable in intercom system 100 are not limited to those in the above-described example. For example, front door slave unit 300 may communicate with a wireless communication terminal on the outside of building 200, packetize and encode information obtained through the communication, and perform transmission to master unit 400 in the slave-unit side transmission section. A camera may be provided in master unit 400, and a display may be provided in front door slave unit 300, and thus image data may be bi-directionally transmitted.

The method of allocation and determination of the slave unit-side transmission section and the master unit-side transmission section is not limited to that in the above-described example. For example, front door slave unit 300 or master unit 400 may change time allocation of the slave unit-side transmission section and the master unit-side transmission section in the predetermined period and change a ratio between these sections, in accordance with variation in quality of sound or an image of each device.

The scheme of digital transmission is not limited to that in the above-described example. For example, front door slave unit 300 and master unit 400 may encode packet data by using the reverse-Manchester code, a mirror code, or the like, and may transmit encoded packet data to the two-wire cable. Front door slave unit 300 and master unit 400 may generate the uplink signal and the downlink signal by using frequency modulation such as frequency shift keying (FSK).

Conclusion of Present Disclosure

In the intercom system according to the present disclosure, the front door slave unit having the attached camera and the master unit are connected to each other through the two-wire cable, and a telephone conversation between the front door slave unit and the master unit is performed while an image signal is transmitted to the master unit from the front door slave unit. The front door slave unit packetizes the control signal, the image signal, and the sound signal of the front door slave unit, generates the uplink signal, and transmits the generated uplink signal to the master unit. The master unit packetizes the control signal and the sound signal of the master unit, generates the downlink signal, and transmits the generated downlink signal to the front door slave unit. The front door slave unit and the master unit perform transmission of the uplink signal and transmission of the downlink signal in a manner of time division duplex by using the two-wire cable.

In the intercom system, the front door slave unit and the master unit may perform transmission of the uplink signal and transmission of the downlink signal in a manner of baseband transmission.

In the intercom system, the front door slave unit and the master unit may transmit the uplink signal or the downlink signal in accordance with the transmission control information which regulates time allocation of the transmission section of the uplink signal and the transmission section of the downlink signal in the predetermined period.

In the intercom system, at least one of the front door slave unit and the master unit may notify the other of the front door slave unit and the master unit of the timing which is a reference of the predetermined period.

The communication method according to the present disclosure is performed in the intercom system in which front door slave unit having the attached camera and the master unit are connected to each other through the two-wire cable, and a telephone conversation between the front door slave unit and the master unit is performed while an image signal is transmitted to the master unit from the front door slave unit. The communication method includes a step of causing the front door slave unit having the attached camera to packetize the control signal, the image signal, and the sound signal of the front door slave unit and to generate the uplink signal, a step of causing the front door slave unit to transmit the generated uplink signal to the master unit which is connected to the front door slave unit through a two-wire cable, by using the two-wire cable, a step of causing the master unit to packetize the control signal and the sound signal of the master unit and to generate the downlink signal, and a step of causing the master unit to transmit the generated downlink signal to the front door slave unit by using two-wire cable at the timing when the front door slave unit does not transmit the uplink signal.

The present disclosure is useful as the intercom system which can realize high-quality image display and a telephone conversation with low cost, and the communication method of the intercom system.

What is claimed is:

1. An intercom system comprising:
a front door slave unit which has an attached camera, a microphone and a speaker; and
a master unit which is connected to the front door slave unit through a two-wire cable capable of analog transmission, the master unit having a display, a microphone and a speaker,
wherein the front door slave unit packetizes a slave control signal, an image signal obtained by the camera, and a sound signal obtained by the microphone of the front door slave unit, generates an uplink signal, and transmits the uplink signal that is generated to the master unit,
the master unit packetizes a master control signal and a sound signal obtained by the microphone of the master unit, generates a downlink signal, and transmits the downlink signal that is generated to the front door slave unit, and
the front door slave unit and the master unit perform transmission of the uplink signal and transmission of the downlink signal in a time division duplex manner using the two-wire cable,
wherein, in packetizing for the uplink signal, the front door slave unit generates a single slave control packet from the slave control signal and the sound signal obtained by the microphone of the front door slave unit, and a plurality of image packets from the image signal obtained by the camera during a transmission and reception frame,
wherein, in packetizing for the downlink signal, the master unit generates a single master control packet from the master control signal and the sound signal obtained by the microphone of the master unit during the transmission and reception frame,
wherein the front door slave unit transmits the single slave control packet and the plurality of image packets for the uplink signal during the transmission and reception frame, and
wherein the master unit transmits the single master control packet between the plurality of image packets received from the front door slave unit for the downlink signal during the transmission and reception frame.

2. The intercom system according to claim 1, wherein the front door slave unit and the master unit perform transmission of the uplink signal and transmission of the downlink signal in a manner of baseband transmission.

3. The intercom system according to claim 1, wherein the front door slave unit and the master unit perform transmission of the uplink signal or the downlink signal in accordance with transmission control information for regulating time allocation of a transmission section of the uplink signal and a transmission section of the downlink signal in a predetermined period.

4. The intercom system according to claim 3, wherein at least one of the front door slave unit and the master unit notifies the other of the front door slave unit and the master unit of a timing serving as a reference of the predetermined period.

5. The intercom system according to claim 1, wherein the front door slave unit generates the uplink signal by generating, at a predetermined interval, a rising signal or a falling signal for a packet, of the slave control packet and the plurality of image packets, using Manchester code, and
the master unit generates the downlink signal by generating, at a predetermined interval, a rising signal or a falling signal for the master control packet, using Manchester code.

6. A communication method of an intercom system, comprising:
causing a front door slave unit having an attached camera, a microphone and a speaker, to packetize a slave control signal, an image signal obtained by the camera, and a sound signal obtained by the microphone of the front door slave unit and to generate an uplink signal;
causing the front door slave unit to transmit the uplink signal that is generated to a master unit which is connected to the front door slave unit through a two-wire cable capable of analog transmission, by using the two-wire cable, the master unit having a display, a microphone and a speaker;
causing the master unit to packetize a master control signal and a sound signal obtained by the microphone of the master unit and to generate a downlink signal; and
causing the master unit to transmit the downlink signal that is generated to the front door slave unit by using the two-wire cable at a timing when the front door slave unit does not transmit the uplink signal,
wherein, in packetizing for the uplink signal, the front door slave unit is caused to generate a single slave control packet from the slave control signal and the sound signal obtained by the microphone of the front door slave unit, and a plurality of image packets from the image signal obtained by the camera during a transmission and reception frame,
wherein, in packetizing for the downlink signal, the master unit is caused to generate a single master control packet from the master control signal and the sound signal obtained by the microphone of the master unit during the transmission and reception frame,
wherein, in transmitting the uplink signal, the front door slave unit is caused to transmit the single slave control packet and the plurality of image packets during the transmission and reception frame, and
wherein, in transmitting the downlink signal, the master unit is caused to transmit the single master control packet between the plurality of image packets received from the front door slave unit during the transmission and reception frame.

* * * * *